United States Patent
Jager et al.

(10) Patent No.: US 11,053,928 B2
(45) Date of Patent: Jul. 6, 2021

(54) ASSEMBLY FOR PRODUCING A THERMOSTATIC ELEMENT

(71) Applicant: VERNET, Ollainville (FR)

(72) Inventors: Frédéric Jager, Saint-Cheron (FR); Denis Baudoin, Saint Germain les Arpajon (FR)

(73) Assignee: VERNET, Ollainville (FR)

( * ) Notice: Subject to any disclaimer, the term of this patent is extended or adjusted under 35 U.S.C. 154(b) by 422 days.

(21) Appl. No.: 16/303,979

(22) PCT Filed: May 24, 2017

(86) PCT No.: PCT/EP2017/062657
§ 371 (c)(1),
(2) Date: Nov. 21, 2018

(87) PCT Pub. No.: WO2017/202981
PCT Pub. Date: Nov. 30, 2017

(65) Prior Publication Data
US 2020/0332779 A1    Oct. 22, 2020

(30) Foreign Application Priority Data
May 25, 2016 (FR) ........................ 1654660

(51) Int. Cl.
*F03G 7/06* (2006.01)
(52) U.S. Cl.
CPC ..................... *F03G 7/06* (2013.01)
(58) Field of Classification Search
CPC .......... F03G 7/06; F16K 31/002; G05D 23/02
(Continued)

(56) References Cited

U.S. PATENT DOCUMENTS

| 2,368,181 A | * | 1/1945 | Vernet | ...................... G01K 5/44 |
|---|---|---|---|---|
| | | | | 60/527 |
| 2,636,776 A | * | 4/1953 | Vernet | .................. G05D 23/022 |
| | | | | 60/527 |

(Continued)

FOREIGN PATENT DOCUMENTS

| CN | 95-05090 | 10/1995 |
|---|---|---|
| CN | 96-20873 | 7/1997 |

(Continued)

OTHER PUBLICATIONS

International French Search Report dated Jan. 30, 2017 in French language.
(Continued)

*Primary Examiner* — Hoang M Nguyen
(74) *Attorney, Agent, or Firm* — Locke Lord LLP

(57) ABSTRACT

This assembly comprises a cup containing a thermally-expandable material, a piston designed to move in translation along an axis (X-X) under the action of the thermally-expandable material, a guide (40) for guiding the piston and intended to be fixed to the cup, and a buffer (60) made of an elastomer material and designed to be interposed between the thermally-expandable material and the piston. The guide is provided with a bore (41) that is intended to be centered on the axis and comprises a first bore portion (41.2) having a constant cross-section, a second bore portion (41.1) provided to receive the piston and having a cross-section that is both constant and smaller than that of the first bore portion, and a third bore portion (41.3) that continuously connects the first and second bore portions. According to the invention, the buffer consists of both first and second end portions (62, 61), which, in the assembled state of the thermostatic element, are respectively received in the first and second bore portions regardless of the translational position of the piston, and of a running portion (63), which coaxially (Continued)

connects the first and second end portions and which, before assembly of the buffer to the rest of the thermostatic element, is at least locally thinner relative to the first end portion, so that, in the assembled state of the thermostatic element, the running portion passes from one to the other of the first and second boring portions, via the third boring portion, and partially releases the internal deformation stresses of the buffer when the piston is translated.

9 Claims, 5 Drawing Sheets

(58) Field of Classification Search
USPC .............................. 60/527–529; 310/306–307
See application file for complete search history.

(56) References Cited

U.S. PATENT DOCUMENTS

| | | | |
|---|---|---|---|
| 2,714,759 | A | 8/1955 | Von Wangenheim |
| 2,901,908 | A * | 9/1959 | Asakawa ................. G01K 5/44 |
| | | | 60/527 |
| 3,016,747 | A * | 1/1962 | Vernet ................. G05D 23/021 |
| | | | 60/527 |
| 3,035,444 | A * | 5/1962 | Pressel ................. G05D 23/021 |
| | | | 60/527 |
| 3,188,867 | A | 6/1965 | Freismuth |
| 3,777,495 | A | 12/1973 | Kuze |
| 6,988,364 | B1 | 1/2006 | Lamb et al. |
| 2004/0112050 | A1 | 6/2004 | Suda et al. |
| 2009/0272816 | A1 | 11/2009 | Lhuillier |
| 2013/0334327 | A1 | 12/2013 | Lamb et al. |
| 2015/0301537 | A1 | 10/2015 | Hong et al. |

FOREIGN PATENT DOCUMENTS

| | | |
|---|---|---|
| CN | 101084477 | 12/2007 |
| EP | 0 942 347 A1 | 9/1999 |
| EP | 2 543 882 A1 | 1/2013 |
| EP | 2 573 532 A1 | 3/2013 |
| FR | 2 879 681 | 6/2006 |
| GB | 879772 | 10/1961 |
| GB | 2529130 | 2/2016 |
| WO | WO 97/49914 | 12/1997 |
| WO | WO 2006/067320 A1 | 6/2006 |
| WO | WO2014106373 | 7/2014 |

OTHER PUBLICATIONS

International Search Report (Form PCT/ISA/210) dated Sep. 14, 2017 in French language.
Chen Darong, "Design of Marine Internal Combustion Engine," National Defense Industry Press, Oct. 1995, relevant pp. 200-201 (in Chinese language).
Yang Chengke, "Construction and repair of automobile engine," Higher Education Press, Jul. 1997, relevant pp. 57-60 (in Chinese language).
French Search Report dated Feb. 7, 2017 in French language.
PCT International Search Report dated Sep. 14, 2017 in French language.

* cited by examiner

ASSEMBLY FOR PRODUCING A THERMOSTATIC ELEMENT

This application is a national phase entry under 35 U.S.C. § 371 of International Application Number PCT/EP2017/062657, filed May 24, 2017, which claims the benefit of French Patent Application Number FR 1654660, filed May 25, 2016, all of which are hereby incorporated by reference in their entireties.

The present invention relates to an assembly for manufacturing a thermostatic element, i.e. a group of distinct constituents, which, upon being assembled with each other, form an element which, by using a thermally-expandable material, transforms heat energy into mechanical energy.

Such elements are commonly used in the field of fluid regulation since they make it possible to divide one fluidic supply channel into one or more distribution channels, as a function of the heat of the fluid to be regulated and/or other heat sources. These elements are arranged, for example, within cooling circuits in which cooling fluid flows, in particular cooling circuits for the combustion engines of automobiles or the like. Of course, other areas of application are conceivable, such as engine oil and gearbox circuits, as well as sanitary water circuits.

Typically, among the components of a thermostatic element, there is a metal cup of generally tubular shape and containing a thermally-expandable material such as wax. Among the other components of the thermostatic element is a piston which is intended to be assembled to the cup, and which is coaxial with the latter and movable in axial translation relative to this cup under the effect of the expansion of the thermally-expandable material contained in the cup when this thermally-expandable material is heated. Upon expanding, the thermally-expandable material drives the piston so that the latter is deployed with respect to the cup, while, during the cooling of the thermally-expandable material, the piston is returned towards the cup, generally under the action of a spring associated with the thermostatic element.

In order to guide the displacements in translation of the piston, and as a component of the thermostatic element, a bored metal guide is provided and inside which the piston may slide, wherein this guide thus constitutes a guide part what is assembled by being attached to the cup.

In addition, to prevent the thermally-expandable material from escaping to the outside of the cup during movement of the piston and to prevent a liquid outside the thermostatic element, and in which this thermostatic element is typically bathed, from seeping along the piston to the axial end of the latter facing the cup, the thermally-expandable material may be sealed with respect to the outside by another component of the thermostatic element, namely a flexible part, assembled by being retained relative to the cup. This flexible sealing part may, in particular, be made in the form of a so-called flat diaphragm, which generally extends perpendicularly to the axis of translation of the piston. The diaphragm is itself interposed axially between the thermally-expandable material and the piston during the expansion of the thermally-expandable material, wherein the diaphragm is deformed to transmit movement in translation to the piston. It should be understood that the stroke of the piston is thus directly related to the amplitude of deformation of the diaphragm.

In order to increase the stroke of the piston for a given deformation of the diaphragm, another component among the constituents of the thermostatic element may be used, namely a buffer that is inserted between the diaphragm and the piston, and is received in the bore of the guide. More specifically, the buffer is received on either side of a narrowing of this bore, while the piston is received in the portion of the bore located on the side of the narrowing facing axially away from the cup. This buffer is a cylinder of elastomer material, for example rubber, whose cross-section is the same as, or even greater than, that of the portion of the bore located on the side of the narrowing axially facing the cup. In this way, in the assembled state of the thermostatic element, the end portion of the buffer, which faces away from the cup, is forced into the narrowing and beyond through the elastic deformation of the elastomer material constituting the buffer. In addition, during the expansion of the thermally-expandable material, the extent of this end portion of the buffer, passing into the narrowing of the bore and beyond this narrowing, increases, which in turn increases the amount of deformed elastomeric material and results in greater deployment of the piston compared to a situation where the bore did not feature the aforementioned narrowing. Examples of thermostatic elements, manufactured by assembling the constituents listed above, are given in EP 0 942 347 and FR 2 879 681.

In the long run, this is because of the repetition of the deployment-return cycles of the piston and the repeated deformation stresses that are applied to the buffer and tend to significantly degrade this buffer, in particular due to frictional wear of the buffer in the guide at the narrowing of the latter. In other words, the aging of the buffer is accompanied by severe damage to its constituent material, in particular because of the internal stresses that it has to absorb at the narrowing of the bore. The performance of the thermostatic element is, of course, degraded, wherein the buffer can no longer, or only partially, ensure its ability to increase the stroke of the piston.

The object of the present invention is to provide an improved set of components for manufacturing a thermostatic element, whose performance, in connection with its buffer, is maintained over time.

For this purpose, the object of the invention is an assembly for manufacturing a thermostatic element, comprising:
  a cup which contains a thermally-expandable material,
  a piston which, in an assembled state of the thermostatic element, is movable relative to the cup in translation along an axis under the action of the thermally-expandable material during expansion of the thermally-expandable material,
  a guide for guiding the piston in translation, wherein the guide is attached to the cup in the assembled state of the thermostatic element and is provided with a bore which, in the assembled state of the thermostatic element, is centered on the axis and which comprises three bore portions that are distinct and coaxial, namely:
    a first bore portion which, in the assembled state of the thermostatic element, is axially faces the cup and has a cross-section that is substantially constant along the axis,
    a second bore portion which, in the assembled state of the thermostatic element is, faces axially away from the cup and has a cross-section that is both substantially constant along the axis and smaller than the cross-section of the first bore portion, the piston being axially received in the second bore portion in an assembled state of the thermostatic element, and
    a third bore portion, which connects the first and second bore portions continuously to each other, and
  a buffer for transmitting motion between the thermally-expandable material and the piston, wherein the buffer is made of an elastomer material and is, in the assembled state of the thermostatic element, both axially interposed between the thermally-expandable material and the piston, and axially received in the first, second and third bore portions while being deformed therein, and wherein the buffer consists of:

a first end portion which, in the assembled state of the thermostatic element, is received in the first bore portion regardless of the translational position of the piston, a second end portion which, in the assembled state of the thermostatic element, is axially opposite the first end portion and is received in the second bore portion regardless of the translational position of the piston, and a running portion, which coaxially connects the first and second end portions and which, before assembly of the buffer with the rest of the thermostatic element, is at least locally thinner with respect to the first end portion so that, in the assembled state of the thermostatic element, the running portion passes from one to the other of the first and second bore portions, via the third bore portion, and partially releases internal deformation stresses of the buffer when the piston is translated.

Thus, the invention goes against the technical belief that the buffers used to manufacture thermostatic elements have to be in the form of a strictly cylindrical elastomer part. In fact, the invention requires that the running portion of the buffer is thinner with respect to the end portion facing the cup, and preferably also with respect to the opposite end portion of the buffer. At the narrowing of the bore between the portions of the latter that are respectively narrower and wider, the running portion of the buffer is thus, in the assembled state of the thermostatic element, subjected to lower deformation stresses than if the running portion was not thinner with respect to at least one of the end portions of the buffer: by virtue of the invention, the internal stresses of the buffer, which result from its deformation as soon as it is received in the bore, are partially released, and are thus held at much lower values than those generated in the absence of thinning of the running portion of the buffer. In addition, as the contact between the buffer and the narrowing of the bore is carried out exclusively along the running portion of the buffer during the translation of the piston, this release of the internal deformation stresses proves to be effective, regardless of the translational position of the piston during the expansion and contraction of the thermally-expandable material. As a result, while benefiting from the effect of the buffer to increase the stroke of the piston, it avoids, or, at the very least, reduces and/or resists, the degradation of this buffer resulting from its friction against the narrowing of the bore. In other words, the aging of the buffer of a thermostatic element manufactured with the assembly according to the invention, is controlled. As a result, inter ala, the hysteresis of a thermostatic element made from the assembly according to the invention is controlled over the long term in the sense that, thanks to the maintenance of the performances of the buffer, the positioning of the piston for a given temperature value and according to whether the temperature is rising or falling, are separated from each other by a difference that, even in the long term, has a low average value and whose separation is limited.

The limitation of the maximum intensity of the stresses is advantageously accentuated, in particular, by adjusting the shape and the axial extent of the thinning of the running part, as well as the relative dimensioning of this thinning and the parts of the bore located on both sides of the narrowing, as presented in more detail in the embodiments described below.

According to additional advantageous features of the assembly according to the invention;

The running portion is, before assembly of the buffer to the rest of the thermostatic element is at least locally thinner also with respect to the second end portion.

The running portion comprises:

a smallest section sub-portion which, before assembly of the buffer to the rest of the thermostatic element, presents, throughout its axial extent, a cross-section which:

is substantially constant, corresponds to the minimum cross-section of the running portion, is smaller than the minimum cross-section of the first end portion, and is smaller than the cross-section of the first bore portion; and a first connecting sub-portion, which connects the smallest section sub-portion and the first end portion and which, before assembly of the buffer with the rest of the thermostatic element, has a cross-section which varies along the axis.

The axial extent of the smallest section sub-portion is reduced to a point.

The running portion is, before assembly of the buffer to the rest of the thermostatic element, at least locally thinner also with respect to the second end portion.

Before assembly of the buffer to the rest of the thermostatic element, the cross-section of the smallest section sub-portion is both smaller than the minimum cross-section of the second end portion and greater than the cross-section of the second bore portion, and the running portion further comprises a second connecting sub-portion, which connects the smallest cross-section sub-portion and the second end portion and which, before assembly of the buffer to the rest of the thermostatic element, has a cross-section that varies along the axis.

Before assembly of the buffer to the rest of the thermostatic element, the cross-section of the smallest cross-section sub-portion is at least 5% smaller than the minimum cross-section of the first end portion.

Before assembly of the buffer to the rest of the thermostatic element, the cross-section of the smallest cross-section sub-portion is at least 5% smaller than the minimum cross-section of the second end portion.

Before assembly of the buffer to the rest of the thermostatic element, the smallest cross-section sub-portion presents an axial dimension that is equal to at least 75% the axial dimension of the running portion.

Before assembly of the buffer to the rest of the thermostatic element, the smallest cross-section sub-portion has an axial dimension equal to at least 90% of the axial dimension of the running portion.

Before assembly of the buffer to the rest of the thermostatic element, the minimum cross-section of the first end portion is substantially identical at the cross-section of the first bore portion.

Before assembly of the buffer to the rest of the thermostatic element, the minimum cross-section of the second end portion is substantially identical to the cross-section of the first bore portion.

Before assembly of the buffer to the rest of the thermostatic element, the running portion is symmetrical with respect to a median plane, which is perpendicular to the axis in the assembled state of the thermostatic element, and with respect to which the first and second end portions are symmetrical to one another.

The cross-sections of the first, second and third bore portions are of circular profile; and before assembly of the buffer to the rest of the thermostatic element, the cross-sections of the first end portion, of the running portion and of the second end portion have a circular profile.

The assembly further comprises a diaphragm for sealing the thermally-expandable material, which, in the assembled state of the thermostatic element, is retained relative to the cup in order to prevent the thermostatic material from escaping from the cup, and is axially interposed between the thermally-expandable material and the first end portion of the buffer.

The invention will be better understood upon reading the description which follows, given solely by way of example and with reference to the drawings, wherein.

Figure 1:
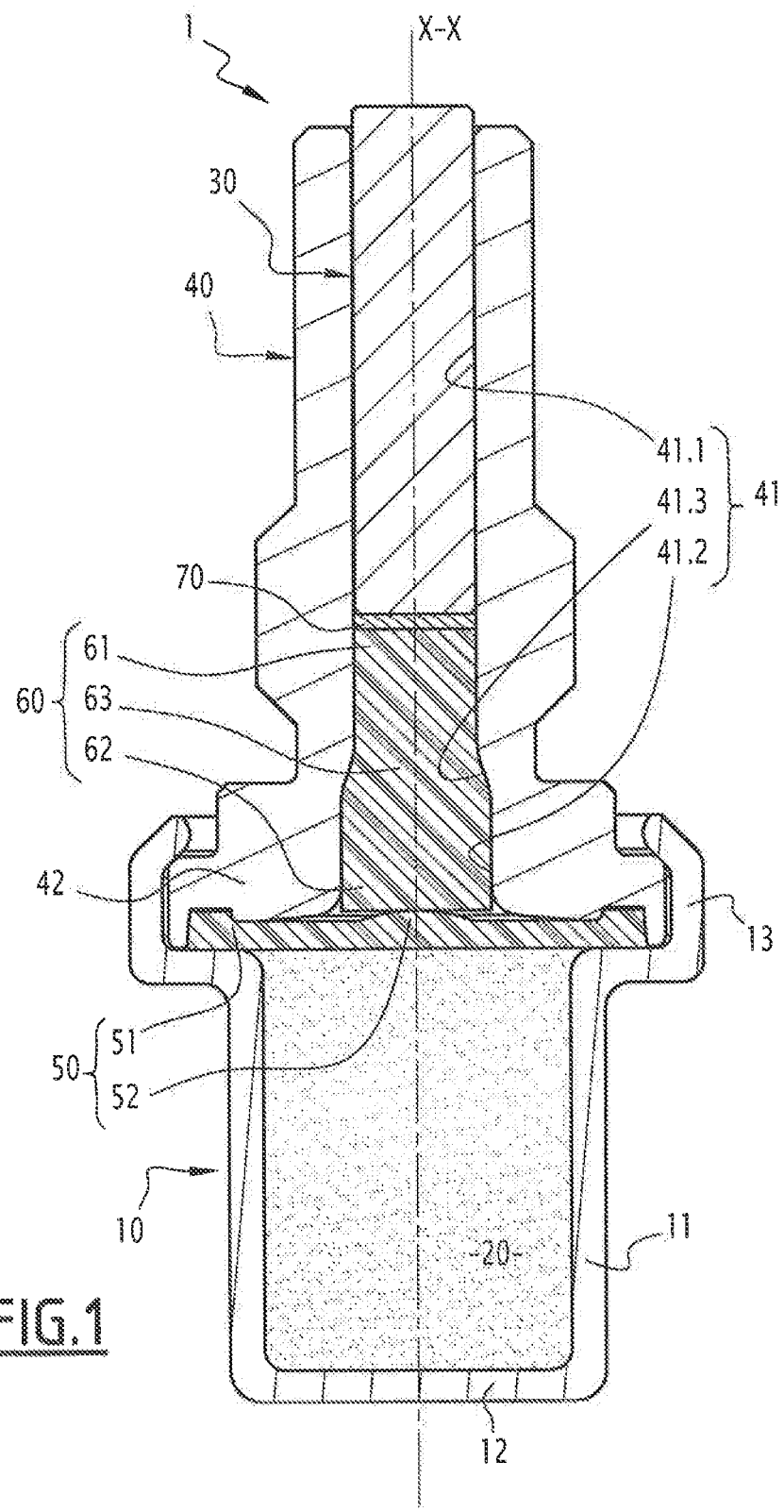
FIG. 1 shows a longitudinal section of a thermostatic element manufactured from an assembly according to the invention.

FIG. 1 shows a thermostatic element 1 made from an assembly comprising a cup 10, a piston 30, a guide 40, a diaphragm 50 and a buffer 60, which will be successively detailed below.

The rigid cup 10 is typically made of a metal alloy that is a good conductor of heat, for example brass. This cup 10 has a generally tubular shape, centered on an axis X-X. In the exemplary embodiment shown in the figure, the cup 10 mainly comprises a barrel 11 of cylindrical shape, with a circular base centered on the X-X axis. This barrel 11 is closed at one of its axial ends by a bottom wall 12. In this way, the cup 10 contains a thermally-expandable material 20 stored inside the barrel 11, wherein this thermally-expandable material consisting, for example, of a wax, is optionally filled with a powder offering good thermal conductivity, for example a copper powder.

Figure 2:
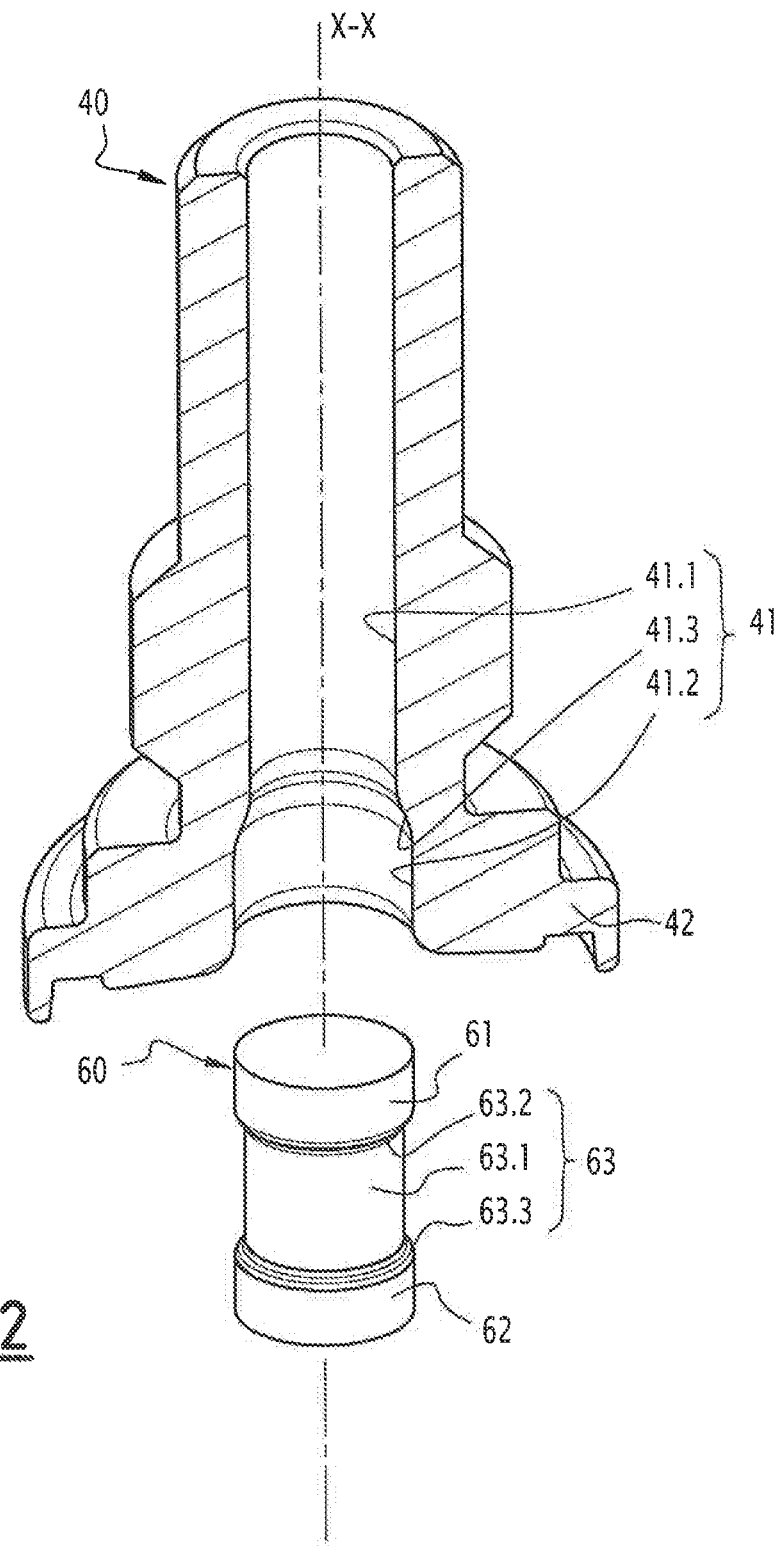
FIG. 2 shows an exploded part, including a buffer, of the assembly from which the thermostatic element of FIG. 1 is manufactured before assembly of the thermostatic element.
Figure 3:
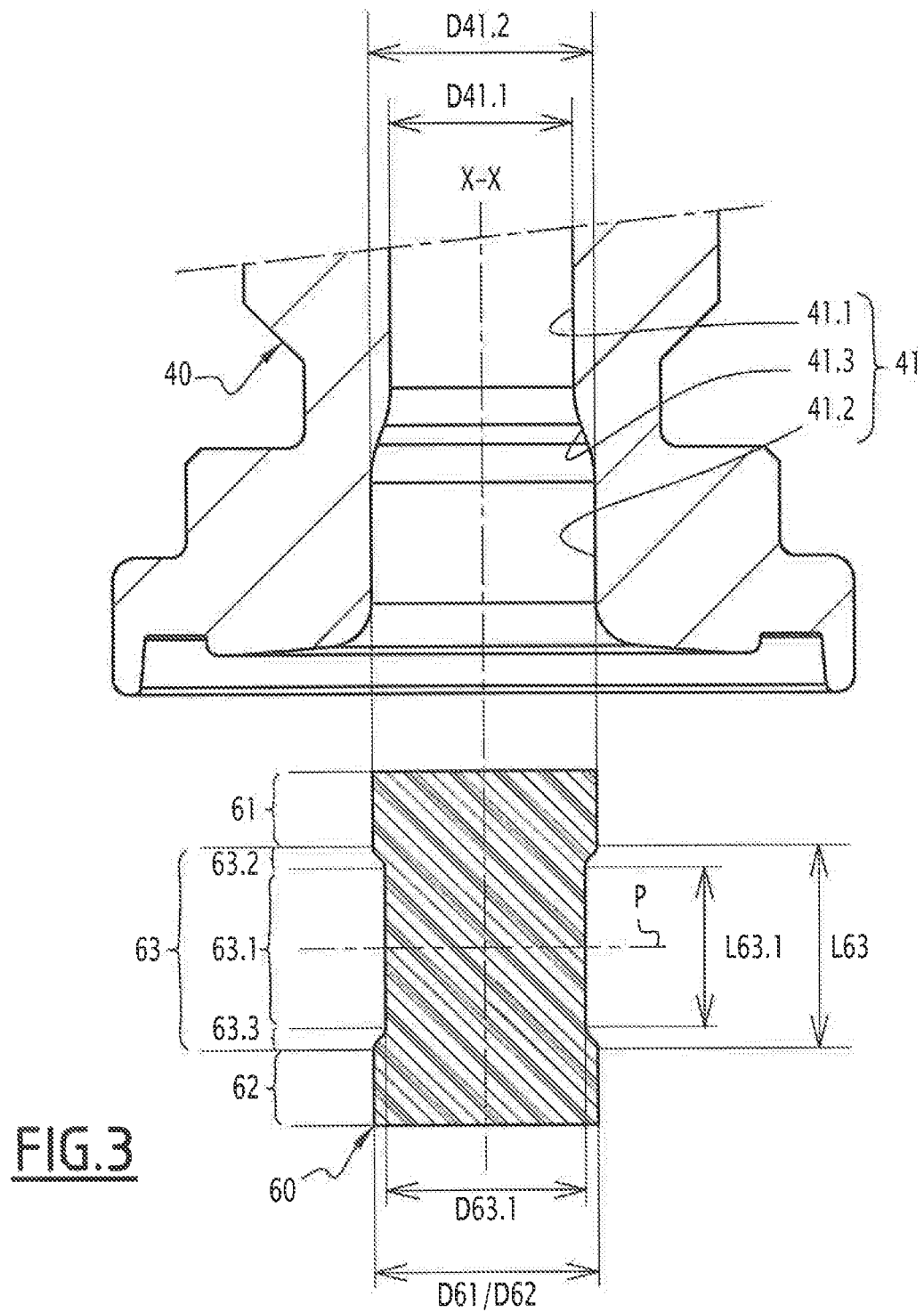
FIG. 3 shows a section, in the same plane as that of FIG. 1, of the part of the assembly, shown in FIG. 2 and not yet assembled.
Figure 4:
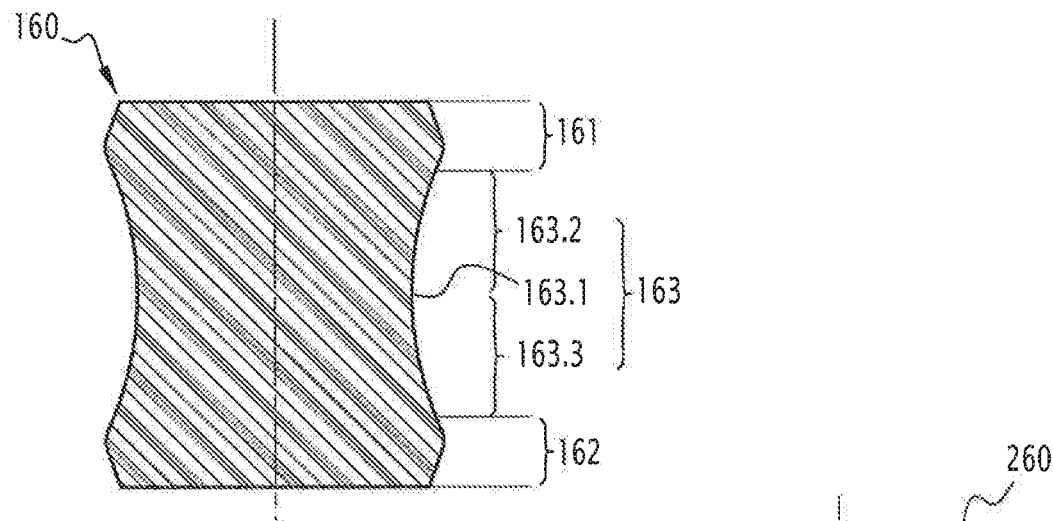
FIG. 4 to 8 show similar sections to that of FIG. 3, respectively showing variants of the buffer, according to the invention.
Figure 5:
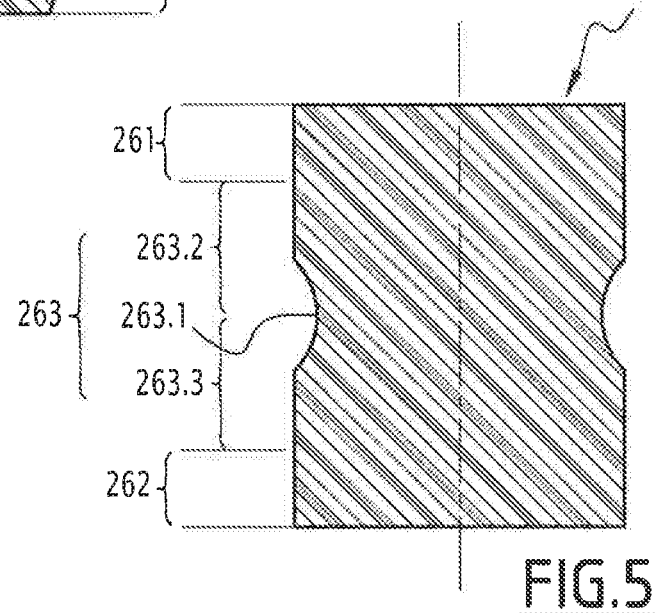
Figure 6:
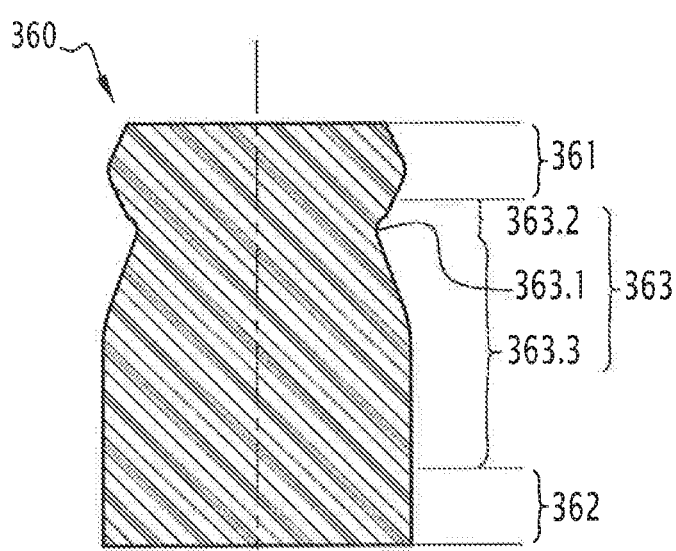
Figure 7:
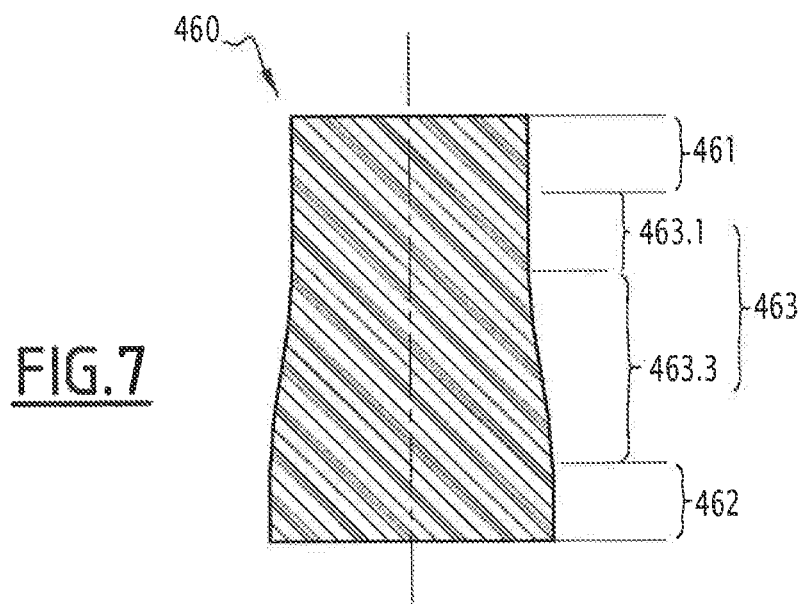
Figure 8:
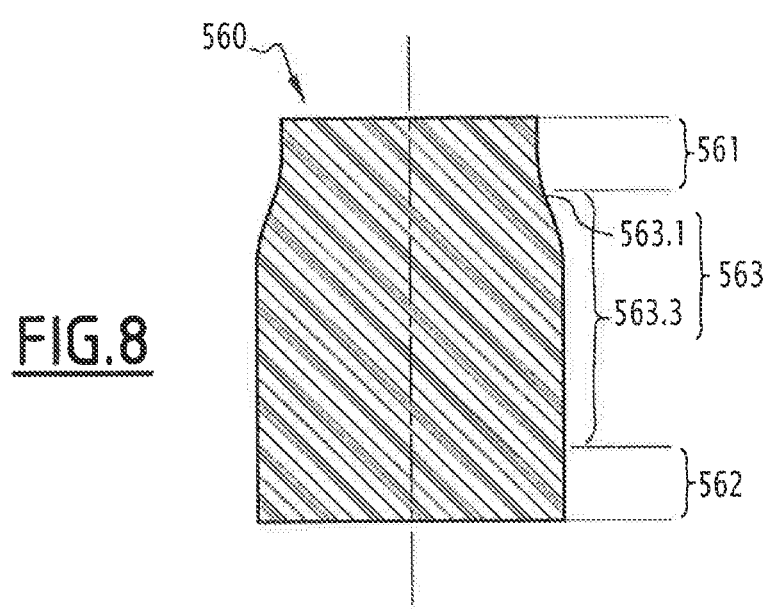

For convenience, the remainder of the description is oriented by considering that the terms "lower" and "low" denote a direction extending along the axis X-X and oriented towards the bottom wall 12, in other words towards the lower part of the FIG. 1 to 3, while the terms "upper" and "high" denote a direction in the opposite direction.

In the assembled state of the thermostatic element 1, as shown in FIG. 1, the piston is arranged coaxially with the cup 10. The lower end of the piston 30 is turned axially towards the cup 10 and is designed to undergo the action of the thermally-expandable material 20 when the material expands as a result of being heating. By means of arrangements described below, the change in the volume of the heated thermally-expandable material causes a translational movement of the piston 30 upwards along the axis X-X relative to the cup 10.

The translational movement of the piston 30 is guided by a rigid part forming the guide 40. This guide 40, like the piston 30, are, in particular, made of metal. As may be clearly seen in FIG. 2, in which only half of the guide 40 is shown, the latter has a generally tubular shape, with a central bore 41 which, as shown in FIG. 1, is centered on the X-X axis in the assembled state of the thermostatic element 1.

As may be clearly seen in FIGS. 2 and 3, the bore 41 is spread along the X-X axis in the form of three bore portions 41.1, 41.2 and 41.3, which are separate from each other and which are coaxial with each other. The bore portion 41.1 is one of the three bore portions axially facing away from the cup 10, while the bore portion 41.2 axially faces the cup, and while the bore portion 41.3 is arranged axially between the bore portions 41.1 and 41.2 by connecting the boring portions to each other in a continuous manner. The bore portions 41.1 and 41.2 each have a cross-section, i.e., a section in a geometrical plane perpendicular to the axis X-X, which is constant along the axis X-X, while the cross-section of the bore portion 41.2 is strictly greater than that of the bore portion 41.1.

In the embodiment considered here, the bore 41 has, over its entire axial extent, a cross-section with a circular profile, centered on the axis X-X: while, as indicated in FIG. 3, the diameter D41.1 of the cross-section of the bore portion 41.1 is strictly smaller than the diameter D41.2 of the cross-section of the bore portion 41.2. In addition, the bore portion 41.3 has a cross-section whose diameter passes progressively, along the axis X-X from the diameter D41.1 at the upper end of the bore portion 41.3 to the diameter D41.2 at the lower end of the bore portion 41.3.

In the assembled state of the thermostatic element 1, as shown in FIG. 1, the piston is axially received in the bore portion 41.1 in a tailored manner, while the cross-section of this bore portion 41.1 is identical to the cross-section of the piston 30 in order to allow guided sliding along the axis X-X, of the piston 30 with a close functional clearance to allow the guided sliding of the piston 30 along the axis X-X.

The guide 40 is also provided with a lower outer flange 42 which is designed to be fixed firmly, in particular by crimping, to a flange 13 of the cup 10, provided at the upper end of the barrel 11. In the assembled state of the thermostatic element 1, as in FIG. 1, the guide is thus fixed to the cup 10 by crimping the flange 13 to the flange 42.

The diaphragm 50 is provided to seal the thermally-expandable material 20 with respect to the outside of the cup 10, in particular, firstly, to prevent the thermally-expandable material from escaping to the outside of the cup during the expansion of this material and, secondly, to prevent a liquid, typically in which the thermostatic element 1 is bathed when in use, from seeping downwards along the piston 30. As shown in FIG. 1, the diaphragm 50 is made in the form of a generally flat membrane, which is made of a flexible material, such as rubber which is either natural or synthetic, and which, in the assembled state of the thermostatic element 1, extends substantially perpendicularly to the axis X-X. In the embodiment considered here, the diaphragm 50 comprises a peripheral portion 51, which, in the assembled state of the thermostatic element, is fixed firmly to the cup 10 by being pressed against an internal shoulder of the flange 13 by the flange 42 of the guide 40. The diaphragm 50 also comprises a central portion 52 which, in the assembled state of the thermostatic element 1, is traversed by the axis X-X and is interposed axially between the thermally-expandable material 20 and the piston 30. During the expansion of the thermally-expandable material 20, the diaphragm 50 is deformed elastically under the action of the thermally-expandable material: more specifically, the central portion 52 of the diaphragm 50 then deforms upwards and axially towards the top inside the bore portion 41.2 of the guide 40, thereby transmitting an upward driving force to the piston 30. To accentuate the driving force upon the piston 30 resulting from the deformation of the diaphragm 50, as well as to center this driving force on the axis X-X, the upper face of the central portion 52 advantageously bulges upwards while being centered on the axis X-X.

In practice, the embodiment of the diaphragm 50 does not limit the invention in as much as everything is retained relative to the cup 10 in order to prevent the thermally-expandable material 20 from escaping from the thermostatic element 1, and as long as this diaphragm 50 is axially interposed between the thermally-expandable material and the piston 30, it transmits, through its deformation, an upwards axial drive movement on the piston 30 during the expansion of the thermally-expandable material.

The buffer 60 is, in turn, provided to increase the driving effect of the piston 30 resulting from the deformation of the diaphragm 50. In the assembled state of the thermostatic element 1, as represented in FIG. 1, the buffer 60 is axially interposed between the diaphragm 50 and the piston 30, more precisely between the central portion 52 of the diaphragm and the lower end of the piston 30. The buffer 60 thus makes it possible to transmit axial movement between the diaphragm 50 and the piston 30, and thus between the thermally-expandable material 20 and the piston.

The buffer 60, which is advantageously in the form of a single part, is made of an elastomer material, in particular rubber, either natural or synthetic.

As may be clearly seen in FIG. 1 to 3, the buffer 60 is, in the direction corresponding to the axis X-X in the assembled state of the thermostatic element 1, in the form of three distinct portions, namely two opposite end portions, respectively an upper end portion 61 and a lower end portion 62, as well as a running portion 63 that coaxially connects the upper end portion 61 and lower end portion 62.

The running portion 63 mainly comprises a sub-portion 63.1, called the smallest section sub-portion, which, before assembly of the buffer 60 to the rest of the thermostatic element 1, as in FIGS. 2 and 3, has a cross-section, i.e. a section in a geometrical plane which is perpendicular to the axis corresponding to the axis X-X in the assembled state of the thermostatic element 1, corresponds to the minimum cross-section of the running portion 63, while the cross-section of this sub-portion 63.1 is constant throughout its axial extent. This cross-section of the sub-portion 63.1 is smaller than the respective minimum cross-sections of the upper end portion 61 and lower end portion 62, wherein it should be noted that, in the embodiment of FIGS. 2 and 3, the cross-sections of the respective end portions 61 and 62 are constant along the axis X-X and are, furthermore, identical to each other.

According to an advantageous design, which is implemented in the exemplary embodiment considered in FIGS. 2 and 3 and which, in particular, facilitates the manufacture of the buffer 60 as well as its assembly with the rest of the thermostatic element 1, the cross-sections of the sub-portion 63.1 and end portions 61 and 62 are circular in profile, so that, as shown in FIG. 3, the diameter D63.1 of the cross-section of the sub-portion 63.1 is smaller than the diameter D61 of the cross-section of the end portion 61 and the diameter D62 of the cross-section of the end portion 62.

To accommodate the variation between the diameters D61 and D63.1, more generally between the respective cross-sections of the end portion 61 and the sub-portion 63.1 of the running portion 63, the running portion 63 comprises a connecting sub-portion 63.2 between its sub-portion 63.1 and the end portion 61. Similarly, to accommodate the variation between the diameters D62 and D63.1, more generally between the respective cross-sections of the lower end portion 62 and the sub-portion 63.1 of the portion 63, the latter includes a connecting sub-portion 63.3 between the sub-portion 63.1 and the lower end portion 62. In the embodiment of FIGS. 2 and 3, the connecting sub-portions 63.2 and 63.3 represent a marginal part of the running portion 63, in the sense that the axial dimension, denoted L63.1, of the sub-portion 63.1 is at least 75%, or even at least 90%, of the axial dimension, denoted L63, of the running portion 63 which amounts to saying that the accumulation of the respective axial dimensions of the connecting sub-portions 63.2 and 63.3 is less than 25% or even less than 10% of the dimension L63. Moreover, by way of a variant (not shown), the buffer 60 may be made without any connecting portions similar to the connecting sub-portions 63.2 and 63.3, in favor of connecting sub-portions that are stepped and that have an axial extent reduced to a point.

According to a particularly advantageous aspect of conformation, which is implemented in the exemplary embodiment considered in FIGS. 2 and 3, the running portion 63 is symmetrical with respect to a geometric median plane P which is perpendicular to the axis X-X in the assembled state of the thermostatic element 1: the upper end portion 61 and lower end portion 62 are symmetrical to each other with respect to this median plane P. In this way, the plane P constitutes a plane of symmetry for the buffer 60 so that the latter may be assembled to the rest of the thermostatic element 1 with either one of its end portions 61 and 62 facing upwards. It should be understood that manipulations of the assembly of the thermostatic element 1 are facilitated.

In the assembled state of the thermostatic element 1, as shown in FIG. 1, the upper end portion 61 of the buffer 60 is received in the bore portion 41.1 while the lower end portion 62 is received in the bore portion 41.2, and while the upper region of the running portion 63 of the buffer is received in the bore portion 41.1, while its lower region is received in the bore portion 41.2, while continuously occupying, the bore portion 41.3 between the high and low regions mentioned above. Thus, during its expansion, the thermally-expandable material 20 bears axially upwards against the lower end portion 62 of the buffer 60 through the diaphragm 50 interposed between the thermally-expandable material and the lower end portion 62. This support drives the buffer 60 towards the top which, by elastic deformation, extends axially in the bore 40, in particular in the bore portion 41.1, by pressing its upper end portion 61 upwards against the piston 30 and causing the upward translation of the latter.

More specifically, the buffer 60 is so designed, in particular by its axial dimensioning, that, during the expansion of the thermally-expandable material, the upper end portion 61 remains in the bore portion 41.1, without reaching the bore portion 41.3, regardless of the translational position of the piston, while the lower end portion 62 remains in the bore portion 41.2, without reaching the bore portion 41.3, regardless of the translational position of the piston: thus, during the expansion of the thermally-expandable material 20, only the running portion 63 of the buffer 60 passes between the bore portion 41.1 and the bore portion 41.2 via the bore portion 41.3.

In addition, the cross-section of the sub-portion 63.1 of the buffer 60 is advantageously dimensioned to be, before assembly of the buffer to the rest of the thermostatic element 1, both greater than the cross-section of the bore portion 41.1 and smaller than the cross-section of the bore portion 41.2: thus, in the exemplary embodiment considered here, as may be clearly seen in FIG. 3, the diameter D63.1 of the cross-section of the running sub-portion 63.1 is larger than the diameter D41.1 of the cross-section of the bore portion 41.1 and is smaller than the diameter D41.2 of the cross-section of the bore portion 41.2. In this way, in the assembled state of the thermostatic element 1, the upper region of the running portion 63 as received in the bore portion 41.1, is received radially tight in this bore portion 41.1, while the low region of the running portion 63, received in the bore portion 41.2, is not tightened by this bore portion 41.2, wherein a radial clearance may, in principle, be formed between them. In practice, the aforementioned clearance does not appear in FIG. 1 because the tightening of the upper region of the running portion 63 in the bore portion 41.1 causes the elastic deformation of this high region, wherein the elastomer material of the buffer 60 then deforms to occupy all the available space, including the aforementioned clearance, in order to minimize the internal stresses that this material undergoes.

Thus, it is understood that the running portion 63 of the buffer 60 is thinner with respect to its end portions 61 and 62: in the assembled state of the thermostatic element 1, when the piston 30 is translated in deployment during the expansion of the thermally-expandable material as well as in the case of the contraction of this material, the running portion 63 releases a portion of the internal stresses of the deformation of the buffer 60, so that the latter is biased by the internal stresses which are lower than if the running portion 63 had presented, before assembly of the buffer 60, a cross-section identical to that of the end portions 61 and 62. This limitation of the internal stresses of the buffer 60 reduces the intensity with which the running portion 63 rubs against the bore 41, in particular against the bore portion 41.3 whose progressive variation of the cross-section is favorable in this respect. In practice, the effect of partial releasing of the internal stresses of the buffer 60 may be substantial since the cross-section of the running portion 63 at its sub-portion 63.1 is at least 5%, or even at least 10%, or even at least 15%, or even at least 20%, or even at least 25%, smaller than the respective cross-sections of the end portions 61 and 62.

By thus limiting the aforementioned internal stresses, premature degradation of the buffer 60 is avoided, in particular its constitutive elastomeric material, by limiting and/or resisting over time the wear of this material resulting from its friction against the bore 41 of the guide 40. Of course, during the change of the translational position of the piston 30, the aforementioned internal stresses are correspondingly changed, due to the variation of the axial extent of the running portion 63 received in the bore portion 41.1 and through the friction of this running portion 63 against the bore portion 41.3.

Moreover, when the buffer 60 is driven upwards by the diaphragm 50 that is deformed under the effect of the thermally-expandable material 20 during the expansion of the latter, the upper end portion 61 and the upper region of the current portion 63 of the buffer are constrained radially in the bore portion 41.1, wherein the buffer 60 is deformed by substantially elongating upwards as result of the elasticity of its constituent elastomer material: in other words, the buffer 60 effectively increases the effect the driving the piston 30 resulting from the deformation of the diaphragm 50, and thus obtaining, for a given deformation of the diaphragm 50, a translational piston stroke that is greater than just the axial amplitude of the deformation of the diaphragm.

In order to optimize both the limitation of the internal stresses of the buffer 60 and the increased driving effect of the piston 30 by the buffer, while facilitating the assembly of the buffer 60 to the rest of the thermostatic element 1, the cross-section of the upper end portion 61 or the cross-section of the lower end portion 62, or, advantageously, these two cross-sections, are identical to the cross-section of the bore portion 41.2 in the embodiment considered here and as shown in FIG. 3, wherein this amounts to the fact that the diameters D61 and/or D62 are equal to the diameter D41.2.

FIG. 4 to 8 show alternative embodiments of the buffer 60, respectively referenced 160, 260, 360, 460 and 560.

Each of the buffers 160, 260, 360, 460 and 560 consists of
- an upper end portion 161, 261, 361, 461, 561 which is functionally similar to the end portion 61 of the buffer 60, in the sense that in the assembled state of the thermostatic element 1, this end portion 161, 261, 361, 461, 561 is received in the bore portion 41.1 of the bore 41 regardless of the translational position of the piston 30, while
- a lower end portion 162, 262, 362, 462, 562 which is functionally similar to the end portion 62 of the buffer 60, in the sense that, in the assembled state of the thermostatic element 1, this end portion 162, 262, 362, 462, 562 is received in the bore portion 41.2 of the bore 41 regardless of the translational position of the piston 30, while
- a running portion 163, 263, 363, 463, 563, which is functionally similar to the running portion 63 of the buffer 60, in the sense that this running portion 163, 263, 363, 463, 563 coaxially connects the upper end portion and lower end portion, passes between the bore portions 41.1 and 41.2, via the bore portion 41.3, when the piston 30 is translated to the assembled state of the thermostatic element 1, and is, before assembly of the buffer 160, 260, 360, 460, 560 to the rest of the thermostatic element 1, at least locally thinner with respect to the lower end portion of this piston, and, for the buffers 160, 260 and 360, with respect to the upper end portion of the buffer.

By providing that the running portion 63, 163, 263 and 363 of the buffers 60, 160, 260 and 360 are thinner both with respect to its upper end portion 61, 161, 261 and 261 with respect to its lower end portion 62, 162, 262 and 362, grease may be advantageously trapped between the bore 41 and this running portion of the piston: wherein a pocket or reserve of grease is, in fact, delimited radially between the bore and the running portion of the buffer, while being sealed at its top and bottom ends by, respectively, the upper and lower end portions of the buffer which are received tightly in the bore portions 41.1 and 41.2. The grease thus retained by the running portion 63, 163, 263 and 263, in particular at the bore portion 41.3, further improves the service life of the thermostatic element 1, by reducing the frictional wear of the buffer 60, 160, 260 and 360.

When compared with buffer 60, the buffer 160 has specificities, namely:
- the cross-sections of its end portions 161 and 162 are not constant along the central axis X-X, but, on the contrary, vary, with a maximum value at an intermediate axial level of these end portions 161 and 162; and
- the cross-section of its running portion 163 also varies continuously between its axially opposite ends, with a minimum value at its median axial level.

The running portion 163 of the buffer 160 is thus comprises:

a sub-portion 163.1, called the smallest cross-section sub-portion, which, before assembly f the buffer 160 to the rest of the thermostatic element 1, is situated axially in the middle of the running portion 163, wherein it has an axial extent reduced to a point and a cross-section corresponding to the minimum cross-section of the running portion 163, while advantageously being both smaller than the cross-section of the bore portion 41.2 and larger than the cross-section of the bore portion 41.1, and the connecting sub-portions 163.2 and 163.3, respectively high and low, which connect the sub-portion 163.1 to, respectively, the upper and lower end portions 161 and 162, and which, before assembling the buffer 160 to the rest of the element thermostatic 1, have a cross-section that varies along the axis X-X over their entire axial extent.

The running portion 263 of the buffer 260 may be similarly described as the running portion 163 of the buffer 160, with the difference that the variation in the cross-section of these respective connecting sub-portions 263.2 and 263.3 is not effective across the entire axial extent of each of these connecting sub-portions, but is provided from its sub-portion 263.1, similar to the sub-portion 163.1 of the buffer 160, only as far as an intermediate axial level of these sub-portions 263.2 and 263.3.

The buffer 360 has, for its part, the specificity that the smallest cross-section sub-portion 363.1 of its running portion 363 is not located axially in the middle of this running portion 363, but is displaced upwards. The connecting sub-portions 363.2 and 363.3 of the running portion 363 are adapted accordingly.

As indicated above, the running portion 463 and 563 of the buffers 460 and 560 have the specificity of being thinner only with respect to its lower end portion 462 and 562. Thus, the cross-section of the smallest cross-section sub-portions 463.1 and 563.1 of the running portions 463 and 563, which corresponds to the minimum cross-section of these running portions, is substantially the same as the cross-section of the upper end portions 461 and 561, while being smaller than the cross-section of the lower end portions 462 and 562. These smallest cross-section sub-portions 463.1 and 563.1 are respectively connected to end portions 462 and 562 by connecting sub-portions 463.3 and 563.3 of their running portion 463, 563, which are functionally similar, for example, to the connecting sub-portion 63.3 of the buffer 60. The difference between the buffers 460 and 560 is due to the axial position and the axial extent of their smallest cross-section; the sub-portion 563.1 has an axial extent reduced to a point and is located at the upper end of the running portion 563, while the sub-portion 463.1 has a larger axial extent.

It should be noted that the inventors have established that the various embodiments of the buffers 60, 160, 260, 360, 460 and 560 have the effect of releasing the internal deformation stresses, as previously explained in detail for the buffer 60, wherein it should be noted that the preferred form, with, in particular, the most significant releasing effect, is the buffer 60 of FIGS. 2 and 3.

Finally, various arrangements and variants of the manufacturing assembly of a thermostatic element as described so far, are also possible. By way of example, in order to prevent the extrusion of the elastomer material constituting the buffer 60, 160, 260, 360, 460 or 560 outside the thermostatic element 1 via the bore portion 41.1 of the guide 40, this assembly may comprise an anti-extrusion disc, such as the anti-extrusion disc 70 shown in FIG. 1, wherein this anti-extrusion disc is centered on the axis X-X and axially interposed between the buffer 60 and the piston 30 in the assembled state of the thermostatic element. This anti-extrusion disc typically has a rigidity greater than that of the buffer 60, but less than that of the guide 40 and the piston 30, for example, as it is made of PTFE (polytetrafluoroethylene).

The invention claimed is:

1. Assembly for manufacturing a thermostatic element, comprising:
   a cup which contains a thermally-expandable material,
   a piston which, in an assembled state of the thermostatic element is movable relative to the cup in translation along an axis under the action of the thermally-expandable material during expansion of the thermally-expandable material,
   a guide for guiding the piston in translation, wherein the guide is attached to the cup in the assembled state of the thermostatic element and is provided with a bore which, in the assembled state of the thermostatic element, is centered on the axis and which comprises three bore portions that are distinct and coaxial, namely:
      a first bore portion which, in the assembled state of the thermostatic element, is axially faces the cup and has a cross-section that is substantially constant along the axis,
      a second bore portion which, in the assembled state of the thermostatic element, is faces axially away from the cup and has a cross-section that is both substantially constant along the axis and smaller than the cross-section of the first bore portion, the piston being axially received in the second bore portion in an assembled state of the thermostatic element, and
      a third bore portion, which connects the first and second bore portions continuously to each other, and
   a buffer for transmitting motion between the thermally-expandable material and the piston, wherein the buffer is made of an elastomer material and is, in the assembled state of the thermostatic element, both axially interposed between the thermally-expandable material and the piston, and axially received in the first, second and third bore portions while being deformed therein,
characterized in that the buffer consists of:
   a first end portion which, in the assembled state of the thermostatic element is received in the first bore portion regardless of the translational position of the piston,
   a second end portion which, in the assembled state of the thermostatic element, is axially opposite the first end portion and is received in the second bore portion regardless of the translational position of the piston, and
   a running portion, which coaxially connects the first and second end portions and which, before assembly of the buffer with the rest of the thermostatic element, is at least locally thinner with respect to the first end portion and with respect to the second end portion so that, in the assembled state of the thermostatic element, the running portion passes from one to the other of the first and second bore portions, via the third bore portion, and partially releases internal deformation stresses of the buffer when the piston is translated, wherein before assembly of the buffer to the rest of the thermostatic element, the running portion is symmetrical with respect to a median plane, which is perpendicular to the axis in the assembled state of the thermostatic element, and with respect to which the first and second end portions are symmetrical to one another, wherein before assembly of the buffer to the rest of the thermostatic element, the minimum cross-section of the first end portion and of the second end portion is substantially identical at the cross-section of the first bore portion, and wherein the running, portion comprises:
  a smallest section sub-portion which, before assembly of the buffer to the rest of the thermostatic element, presents, throughout its axial extent, a cross-section which:
    is substantially constant,
    corresponds to the minimum cross-section of the running portion,
    is smaller than the minimum cross-section of the first end portion and of the second end portion,
    is smaller than the cross-section of the first bore portion, and
    is greater than the cross-section of the second bore portion;
  a first connecting sub-portion, which connects the smallest section sub-portion and the first end portion and which, before assembly of the buffer with the rest of the thermostatic element, has a cross-section which varies along the axis; and
  a second connecting sub-portion, which connects the smallest cross-section sub-portion and the second end portion and which, before assembly of the buffer to the rest of the thermostatic element, has a cross-section that varies along the axis.

2. Assembly according to claim 1, wherein the axial extent of the smallest section sub-portion is reduced to a point.

3. Assembly according to claim 1, wherein before assembly of the buffer to the rest of the thermostatic element, the cross-section of the smallest cross-section sub-portion is at least 5% smaller than the minimum cross-section of the first end portion.

4. Assembly according to claim 3, wherein before assembly of the buffer to the rest of the thermostatic element, the cross-section of the smallest cross-section sub-portion is at least 5% smaller than the minimum cross-section of the second end portion.

5. Assembly according to claim 1, wherein before assembly of the buffer to the rest of the thermostatic element, the smallest cross-section sub-portion presents an axial dimension that is equal to at least 75% of the axial dimension of the running portion.

6. Assembly according to claim 5, wherein before assembly of the buffer to the rest of the thermostatic element, the smallest cross-section sub-portion has an axial dimension equal to at least 90% of the axial dimension of the running portion.

7. Assembly according to claim 1, wherein the cross-sections of the first, second and third bore portions are of circular profile, and in that, before assembly of the buffer to the rest of the thermostatic element, the cross-sections of the first end portion of the running portion and of the second end portion have a circular profile.

8. Assembly according to claim 1, wherein the assembly further comprises a diaphragm for sealing the thermally-expandable material, which in the assembled state of the thermostatic element is retained relative to the cup in order to prevent the thermostatic material from escaping from the cup, and is axially interposed between the thermally-expandable material and the first end portion of the buffer.

9. Assembly according to claim 1, wherein the first and second end portions have a cross-section that is constant along the axis.

* * * * *